US008368756B2

(12) United States Patent
Konno (10) Patent No.: US 8,368,756 B2
(45) Date of Patent: Feb. 5, 2013

(54) IMAGING APPARATUS AND CONTROL METHOD THEREFOR

(75) Inventor: Georgero Konno, Kanagawa (JP)

(73) Assignee: Sony Corporation, Tokyo (JP)

( * ) Notice: Subject to any disclaimer, the term of this patent is extended or adjusted under 35 U.S.C. 154(b) by 1470 days.

(21) Appl. No.: 11/704,081

(22) Filed: Feb. 8, 2007

(65) Prior Publication Data

US 2007/0188608 A1  Aug. 16, 2007

(30) Foreign Application Priority Data

Feb. 10, 2006  (JP) ................................ P2006-034287

(51) Int. Cl.
*H04N 7/18* (2006.01)
*H04N 9/47* (2006.01)
*H04N 9/18* (2006.01)

(52) U.S. Cl. .......................... 348/155; 348/143; 348/152
(58) Field of Classification Search ................... 348/155
See application file for complete search history.

(56) References Cited

U.S. PATENT DOCUMENTS

| | | | | |
|---|---|---|---|---|
| 5,581,297 A | * | 12/1996 | Koz et al. ..................... | 348/152 |
| 5,666,157 A | * | 9/1997 | Aviv ............................. | 348/152 |
| 6,011,901 A | * | 1/2000 | Kirsten ........................ | 386/226 |
| 6,028,626 A | * | 2/2000 | Aviv ............................. | 348/152 |
| 6,373,968 B2 | * | 4/2002 | Okano et al. ................ | 382/117 |
| 6,754,367 B1 | * | 6/2004 | Ito et al. ...................... | 382/103 |
| 6,865,283 B1 | * | 3/2005 | Cheung ........................ | 382/107 |
| 7,242,295 B1 | * | 7/2007 | Milinusic et al. ............ | 340/541 |
| 7,250,853 B2 | * | 7/2007 | Flynn ........................... | 340/506 |
| 7,634,142 B1 | * | 12/2009 | Bourdev et al. .............. | 382/224 |
| 7,683,929 B2 | * | 3/2010 | Elazar et al. ................. | 382/103 |
| 2002/0171734 A1 | * | 11/2002 | Arakawa et al. ............. | 348/143 |
| 2003/0185419 A1 | * | 10/2003 | Sumitomo .................... | 382/103 |
| 2004/0075738 A1 | * | 4/2004 | Burke et al. .................. | 348/143 |
| 2004/0117638 A1 | * | 6/2004 | Monroe ........................ | 713/186 |
| 2004/0131231 A1 | * | 7/2004 | Smilansky .................... | 382/103 |
| 2004/0233282 A1 | * | 11/2004 | Stavely et al. ............... | 348/143 |
| 2005/0030376 A1 | * | 2/2005 | Terada et al. ................ | 348/143 |
| 2005/0162268 A1 | * | 7/2005 | Grindstaff et al. ........... | 340/531 |
| 2005/0226463 A1 | * | 10/2005 | Suzuki et al. ................ | 382/103 |
| 2005/0271250 A1 | * | 12/2005 | Vallone et al. ............... | 382/103 |
| 2005/0280711 A1 | * | 12/2005 | Ishii et al. ............... | 348/207.99 |

(Continued)

FOREIGN PATENT DOCUMENTS

JP  09-114988 A  *  5/1997
JP  11-112674 A  *  4/1999

(Continued)

*Primary Examiner* — David Lazaro
*Assistant Examiner* — Robert Shaw
(74) *Attorney, Agent, or Firm* — Frommer Lawrence & Haug LLP; William S. Frommer (57) ABSTRACT

An imaging apparatus includes: an image creating section imaging a predetermined surveillance range and creating image data; an image processing section in which computing processing means having a predetermined processing ability performs first image processing of detecting an abnormality in the surveillance range in accordance with the image data and generating a first detection signal and second image processing of converting the image data to a predetermined data format in parallel; and a determination processing section determining whether a predetermined subject under surveillance exists in the surveillance range or not based on the first detection signal, generating and supplying a first control signal to the image processing section if it is determined that the subject under surveillance does not exist, and generating and supplying a second control signal to the image processing section if it is determined that the subject under surveillance exists.

5 Claims, 5 Drawing Sheets

U.S. PATENT DOCUMENTS

2005/0286741 A1* 12/2005 Watanabe et al. ............. 382/107
2006/0028547 A1* 2/2006 Chang ........................... 348/143
2006/0136597 A1* 6/2006 Shabtai et al. ................ 709/231
2006/0139162 A1* 6/2006 Flynn ............................ 340/521
2007/0011722 A1* 1/2007 Hoffman et al. .................. 726/3

FOREIGN PATENT DOCUMENTS

JP      2004 128899      4/2004

* cited by examiner

FIG. 1

FIG. 3A
DETECTION MODE

SUBJECT UNDER SURVEILLANCE APPEARS

FIG. 3B
SHOOTING MODE

SUBJECT UNDER SURVEILLANCE DISAPPEARS

DETECTION MODE

FIG. 5B

SHOOTING MODE

SUBJECT UNDER SURVEILLANCE APPEARS

SUBJECT UNDER SURVEILLANCE DISAPPEARS

IMAGING APPARATUS AND CONTROL METHOD THEREFOR

CROSS REFERENCES TO RELATED APPLICATIONS

The present invention contains subject matter related to Japanese Patent Application JP2006-034287 filed in the Japanese Patent Office on Feb. 10, 2006, the entire contents of which being incorporated herein by reference.

BACKGROUND OF THE INVENTION

1. Field of the Invention

The present invention relates to an imaging apparatus that images a predetermined surveillance range and detects a subject under surveillance and a control method therefor.

2. Description of the Related Art

A surveillance camera is provided in various places for monitoring a suspicious person, for example, in a surveillance range. Some surveillance cameras may detect whether a subject under surveillance exists in a surveillance range or not based on an imaged image. JP-A-2004-128899 (Patent Document 1) discloses a technology in which multiple surveillance cameras image a surveillance range from different image angles and supply the imaged images to a host computer, and the host computer detects an abnormality in the surveillance range based on the data and performs a surveillance activity by connecting the surveillance cameras in accordance with the detection result.

Furthermore, a surveillance camera in the past may perform various kinds of image processing such as processing of detecting a subject under surveillance based on an imaged image, transmission processing of transmitting an imaged image to external equipment, processing of compressing an imaged image and processing of recording an imaged image. The surveillance camera allocates the processing ability of a computing processing unit within the camera to each image processing in advance and performs multiple kinds of image processing in parallel by using the computing processing unit.

SUMMARY OF THE INVENTION

However, a surveillance camera in the past that performs the various kinds of image processing may not efficiently use the processing ability of a computing processing unit provided within the camera since one kind of image processing is allocated an unnecessarily larger proportion of the processing ability in accordance with the state of a surveillance range while the other image processing is not allocated sufficient processing ability.

Accordingly, it is desirable to propose an imaging apparatus that can efficiently use the processing ability of a computing processing unit that performs image processing and a control method for the imaging apparatus.

According to an embodiment of the present invention, there is provided an imaging apparatus including an image creating section imaging a predetermined surveillance range and creating image data, an image processing section in which computing processing means having a predetermined processing ability performs first image processing of detecting an abnormality in the surveillance range in accordance with the image data and generating a first detection signal and second image processing of converting the image data to a predetermined data format in parallel, and a determination processing section determining whether a predetermined subject under surveillance exists in the surveillance range or not based on the first detection signal, generating and supplying a first control signal to the image processing section if it is determined that the subject under surveillance does not exist, and generating and supplying a second control signal to the image processing section if it is determined that the subject under surveillance exist, wherein the image processing section allocates a larger proportion of the processing ability of the computing processing means to the first image processing than that to the second image processing if the first control signal is supplied thereto and allocates a larger proportion of the processing ability of the computing processing means to the second image processing than that to the first image processing if the second control signal is supplied thereto.

According to another embodiment of the invention, there is provided a control method for an imaging apparatus that images a predetermined surveillance range and detects a subject under surveillance, the method including the steps of imaging the surveillance range and creating image data, performing first image processing of detecting an abnormality in the surveillance range in accordance with the image data and generating a first detection signal and second image processing of converting the image data to a predetermined data format in parallel by computing processing means having a predetermined processing ability, determining whether the subject under surveillance exists in the surveillance range or not based on the first detection signal, allocating a larger proportion of the processing ability of the computing processing means to the first image processing than that to the second image processing if it is determined that the subject under surveillance does not exist in the surveillance range, and allocating a larger proportion of the processing ability of the computing processing means to the second image processing than that to the first image processing if it is determined that the subject under surveillance exists in the surveillance range.

According to the embodiments of the invention, whether the subject under surveillance exists in a surveillance range or not is determined based on a first detection signal. A larger proportion of the processing ability of computing processing means is allocated to first image processing than that to the second image processing if it is determined that the subject under surveillance does not exist in the surveillance range, and a larger proportion of the processing ability of computing processing means is allocated to second image processing than that to the first image processing if it is determined that the subject under surveillance exists in the surveillance range.

Thus, according to the embodiments of the invention, since a large proportion of the processing ability of computing processing means is allocated to necessary image processing in accordance with the state of a surveillance range, the image processing ability of the imaging apparatus can be increased without increasing the processing ability of the computing processing means.

DESCRIPTION OF THE PREFERRED EMBODIMENTS

Referring to drawings, a specific embodiment according to the invention will be described in detail below.

Figure 1:
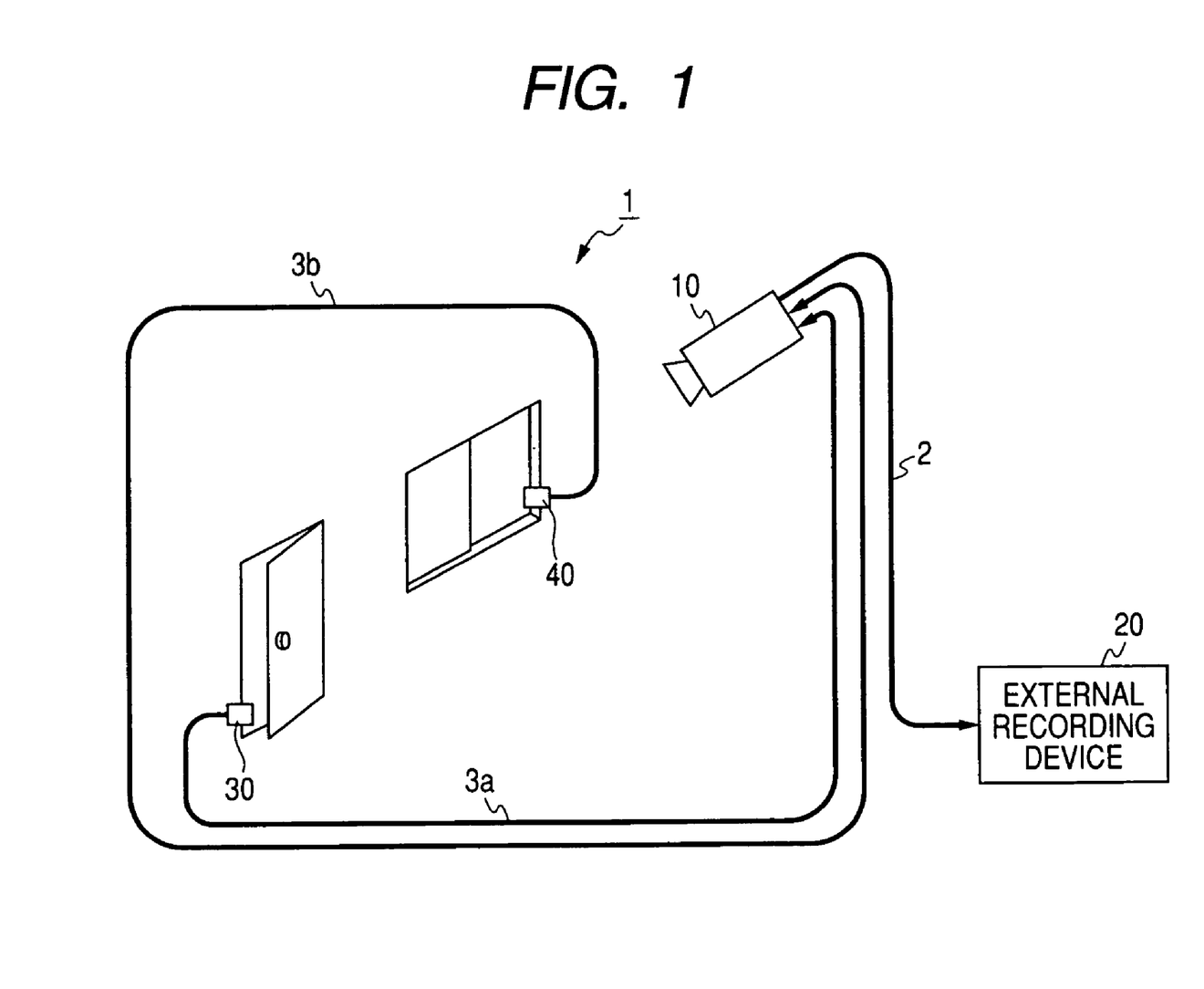
FIG. 1 is a schematic diagram showing a construction of a surveillance system.

As shown in FIG. 1, a surveillance system 1 includes a surveillance camera 10, an external recording device 20, a door open/close sensor 30 and a window open/close sensor 40. The surveillance camera 10 images a predetermined surveillance range. The external recording device 20 records an image imaged by the surveillance camera 10. The door open/close sensor 30 detects the opening or closing of a door and outputs a detection signal. The window open/close sensor 40 detects the opening or closing of a window and outputs a detection signal.

The surveillance camera 10 images a surveillance range and transmits image data obtained from an imaged image to the external recording device 20 via a predetermined communication cable 2. The surveillance camera 10 further supplies a sensor signal from the door open/close sensor 30 and window open/close sensor 40 through predetermined sensor signal lines 3a and 3b.

The external recording device 20 receives and records image data transmitted from the surveillance camera 10 via the communication cable 2.

The door open/close sensor 30 is a sensor that detects the opening or closing of a door and determines that an abnormality occurs in a surveillance range if a door is opened and supplies the sensor signal to the surveillance camera 10 through the sensor signal line 3a.

The window open/close sensor 40 is a sensor that detects the opening or closing of a window and determines that an abnormality occurs in a surveillance range if a window is opened and supplies the sensor signal to the surveillance camera through the sensor signal line 3b.

Figure 2:
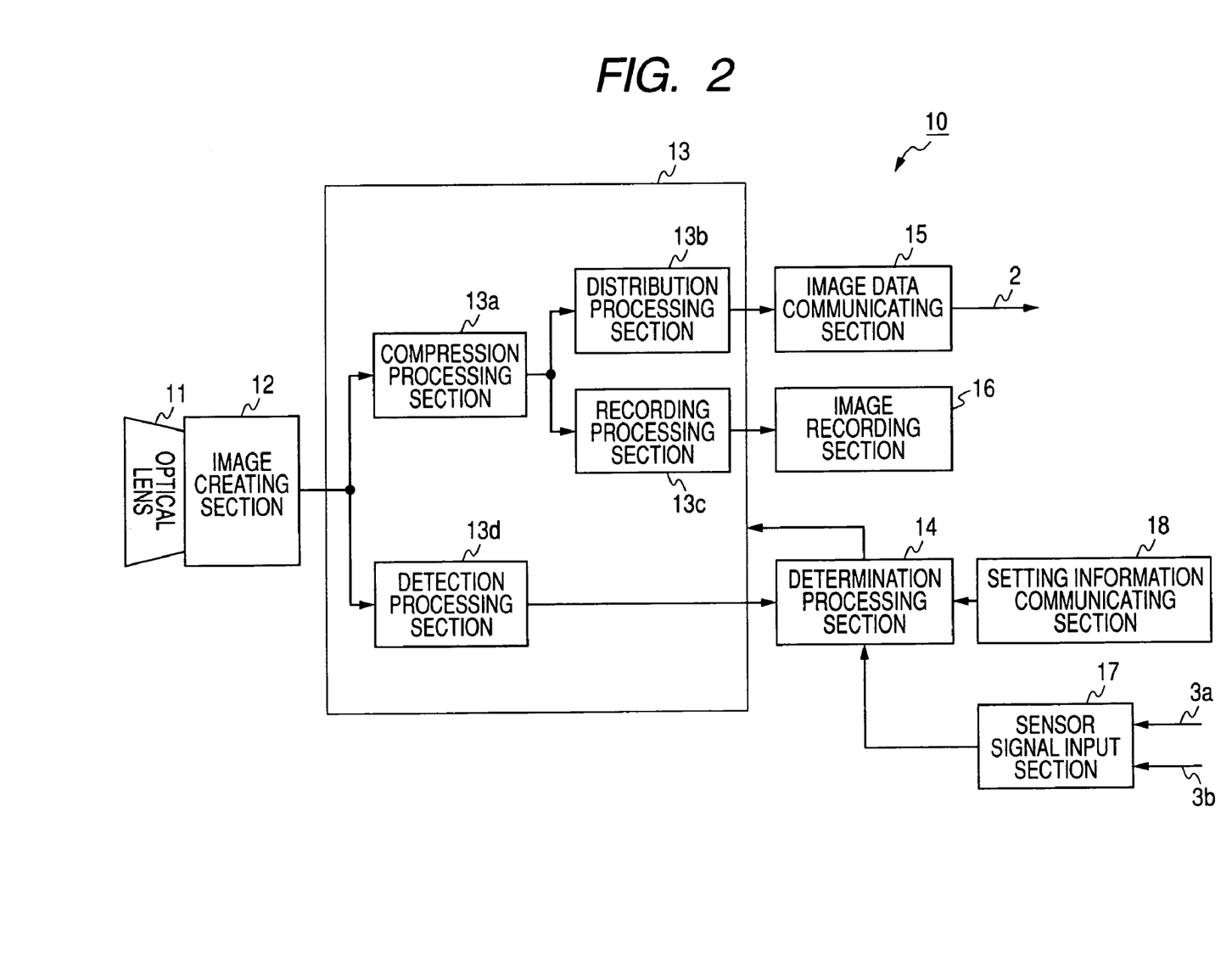
FIG. 2 is a block diagram showing a construction of a surveillance camera.

Next, referring to FIG. 2, a construction of the surveillance camera 10 will be described in detail.

The surveillance camera 10 includes an optical lens 11, an image creating section 12, an image processing section 13, a determination processing section 14, an image data communicating section 15, an image recording section 16, a sensor signal input section 17 and a setting information communicating section 18.

The image creating section 12 creates image data from a subject in a surveillance range captured by the lens 11 and supplies the image data to the image processing section 13. More specifically, the image creating section 12 creates image data by performing processing such as contrast adjustment, gamma correction, edge correction and frame interpolation on an imaged image.

The image processing section 13 includes a compression processing section 13a, a distribution processing section 13b, a recording processing section 13c and a detection processing section 13d. The image processing section 13 performs processing of the processing sections by a processor having a predetermined processing ability. The image processing section 13 may perform processing of the processing sections by using multiple interlocking processors without limiting to the case that processing of the processing sections is performed by one processor. The image processing section 13 allocates the predetermined processing ability of the processor to the processing sections 13a to 13d and performs those kinds of processing in parallel on the processor.

The compression processing section 13a compresses image data supplied from the image creating section 12 and creates compressed image data. The compression processing section 13a supplies the compressed image data to the distribution processing section 13b and recording processing section 13c.

The distribution processing section 13b converts the compressed image data supplied from the compression processing section 13a to a communication format compatible with the image data communicating section 15 and supplies the result to the image data communicating section 15.

The recording processing section 13c converts the compressed image data supplied from the compression processing section 13a to a recording format compatible with the image recording section 16 and supplies the result to the image recording section 16.

The detection processing section 13d detects whether an abnormality occurs within a surveillance range or not from image data supplied from the image creating section 12 and supplies the image processing detection signal in accordance with the detection result to the determination processing section 14. Here, the abnormality refers to a change in state within a surveillance range and is detected by processing steps which will be specifically described below. That is, the detection processing section 13d compares multiple pieces of image data at serial imaged times, extracts a part having a movement in a subject and detects whether an abnormality occurs within a surveillance range or not. Then, the detection processing section 13d supplies an image detection signal in accordance with the information on the size and/or moving time of the extracted moving part to the determination processing section.

The image data communicating section 15 transmits compressed image data in a predetermined communication format supplied from the distribution processing section 13b to the external recording device 20 via the communication cable 2.

The image recording section 16 records compressed image data in a predetermined recording format supplied from the recording processing section 13c onto a predetermined recording medium.

The sensor signal input section 17 receives the input of and supplies the sensor signals supplied from the door open/close sensor 30 and window open/close sensor 40 to the determination processing section 14 through the sensor signal lines 3a and 3b.

The setting information communicating section 18 detects a setting information signal supplied from a predetermined information processing apparatus through a predetermined communication unit and supplies the setting information in accordance with the setting information signal to the determination processing section 14. Here, the setting information signal refers to a communication signal in accordance with a control command to the surveillance camera 10, such as a start command and an imaging start command.

The determination processing section 14 determines whether a subject under surveillance exists in a surveillance range or not based on the image detection signal supplied from the detection processing section 13d and the sensor signal supplied from the sensor signal input section 17 and supplies a control signal in accordance with the determination result to the image processing section 13. More specifically, the determination processing section 14 sets a threshold value to each of multiple determination factors based on an image detection signal and/or a sensor signal and determines whether a subject under surveillance exists or not based on whether these determination factors are higher than the threshold values. The determination processing section 14 determines these determination factors in accordance with the setting information supplied from the setting information communicating section 18.

Figure 3A:
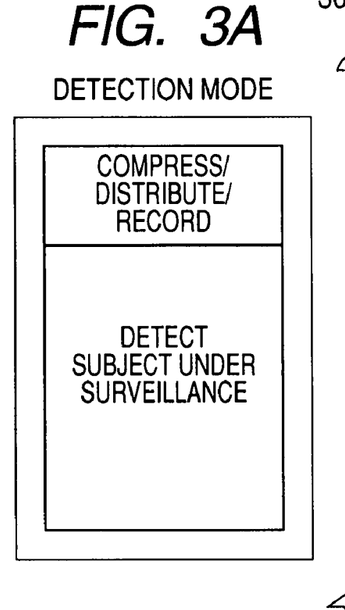
FIGS. 3A and 3B are schematic diagrams showing the allocation of the processing ability of a processor in accordance with a detection mode (3A) and a shooting mode (3B)
Figure 3B:
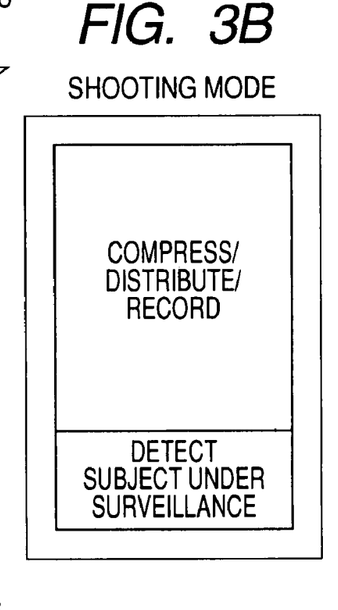

The image processing section 13 allocates the processing ability of the processor to the processing sections 13a to 13d in accordance with the control signal supplied from the determination processing section 14. More specifically, the processing ability of the processor is allocated to the processing sections 13a to 13d based on the control signal and in accordance with a detection mode or a shooting mode as shown in FIGS. 3A and 3B. In the detection mode, as shown in FIG. 3A, a larger proportion of the processing ability of the processor is allocated to the detection processing section 13d than those to the compression processing section 13a, distribution processing section 13b and recording processing section 13c. On the other hand, in the shooting mode, as shown in FIG. 3B, a larger proportion of the processing ability of the processor is allocated to the compression processing section 13a, distribution processing section 13b and recording processing section 13c than that to the detection processing section 13d.

The proportion to be allocated of the processing ability to the processing sections 13a to 13d in the image processing section 13 in accordance with the detection mode and shooting mode may be pre-set or may be set in accordance with the setting information supplied from the setting information communication section 18 to the determination processing section 14.

Figure 4:
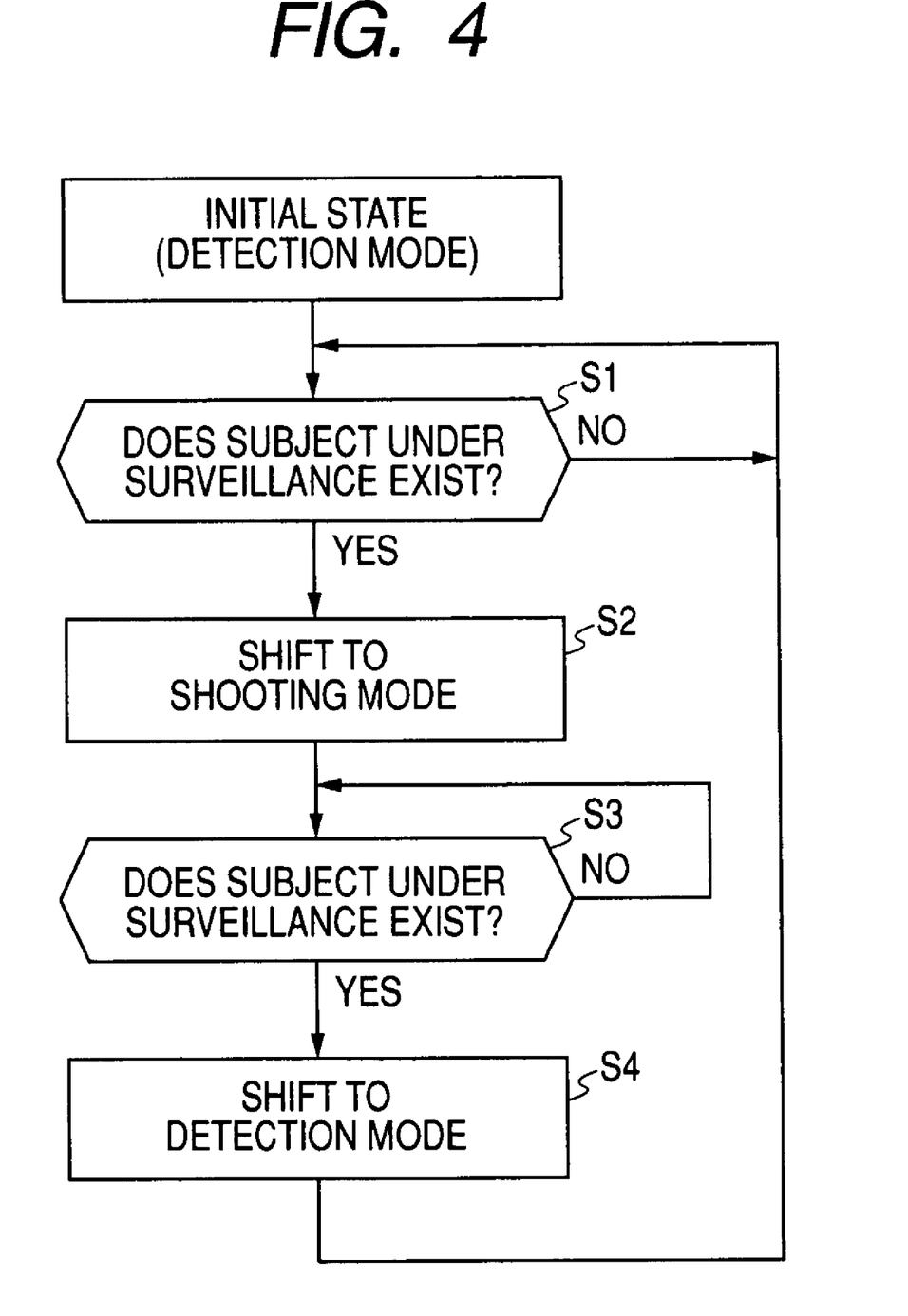
FIG. 4 is a flowchart showing processing steps by an image processing section in accordance with the detection mode and the shooting mode.

Next, processing steps by the image processing section 13 in accordance with the detection mode and shooting mode will be described in detail with reference to FIG. 4. It is assumed that the processing steps are performed when a suspicious person who is a subject under surveillance brakes into a surveillance range.

In the initial stage of the processing steps, the image processing section 13 is first set at the detection mode to cause the detection processing section 13d to detect an abnormality in a surveillance range faster.

In step S1, the image processing section 13 causes the detection processing section 13d to detect whether an abnormality occurs within a surveillance range or not in accordance with the image data supplied from the image creating section 12. The detection processing section 13d repeats the detection processing until an abnormality occurs within the surveillance range, supplies an image detection signal to the determination processing section 14 and moves to step S2 when the fact that an abnormality occurs within the surveillance range is detected. The determination processing section 14 determines the fact that a suspicious person has broken into the surveillance range in accordance with the image detection signal supplied from the detection processing section 13d and the sensor signal supplied from the sensor signal input section and supplies the control signal to shift from the detection mode to the shooting mode to the image processing section 13 in accordance with the determination result.

In step S2, the image processing section 13 shifts the processor from the detection mode to the shooting mode in accordance with the control signal supplied from the determination processing section 14. After the shift to the shooting mode, the image processing section 13 allocates a larger proportion of the processing ability of the processor to compression processing, for example than that to detection processing and performs processing of storing and distributing image data resulting from the imaging of a suspicious person mainly. The image processing section 13 allocates a part of the processing ability of the processor to the detection processing even after the shift to the shooting mode, and the detection processing is continuously performed. The detection processing by the image processing section 13 in the shooting mode will be described for the subsequent processing steps.

In step S3, the image processing section 13 causes the detection processing section 13d to detect a suspicious person in accordance with the image data supplied from the image creating section 12. The detection processing section 13d repeats the detection processing until a suspicious person is no longer detected, supplies an image detection signal to the determination processing section 14 and moves to step S4 when a suspicious person is no longer detected. On the other hand, the determination processing section 14 detects that a suspicious person no longer exists in the surveillance range in accordance with the image detection signal and sensor signal and supplies a control signal to shift from the detection mode to the shooting mode to the image processing section 13 in accordance with the determination result.

In step S4, the image processing section 13 shifts the processor from the shooting mode to the detection mode in accordance with the control signal supplied from the determination processing section 14.

By following these processing steps, the image processing section 13 selects the detection mode or the shooting mode and performs image processing. Then, since the image processing section 13 performs the processing in step S1 in the detection mode, the fact that a suspicious person has broken into a surveillance range can be detected faster than the operation in the shooting mode.

On the other hand, since the image processing section 13 performs the processing of detecting a suspicious person in the shooting mode in step S3, the fact that a suspicious person has left the surveillance range may not be detected faster than the operation in the detection mode. However, the reduction in speed of the detection of the fact that a suspicious person has left the surveillance range may not have an effect on missing the suspicious person in shooting and therefor a less effect on the surveillance activity. In other words, in step S3, the image processing section 13 can allocate larger proportions of processing ability to the compression processing section 13a, distribution processing section 13b and recording processing section 13c than the processing ability to the detection processing section 13d that detects a suspicious person in the shooting mode.

Since the surveillance camera 10 can allocate the processing ability of the processor of the image processing section 13 properly to the processing sections 13a to 13d in accordance with the detection mode and shooting mode as described above, each of the image processing abilities can be improved without requiring an increase in processing ability of the processor itself.

The processing ability of the processor in a surveillance camera may be often limited when the power supply is limited, when the upper limit of the normal operational temperature of a surveillance camera is set higher in order to use the surveillance camera outdoors and/or when the budget is limited. Since each of the image processing abilities can be improved in the surveillance camera 10 according to this embodiment without any increase in processing ability of the processor itself, the image processing abilities can be achieved which may not have been achieved in the past when the processing ability of the processor is limited.

Notably, the processing ability of the processor of the image processing section 13 may be allocated to the processing to be performed by the image creating section 12. In this case, the processing ability of the processor is allocated to the processing sections in accordance with the detection mode and shooting mode as described below.

Figure 5A:
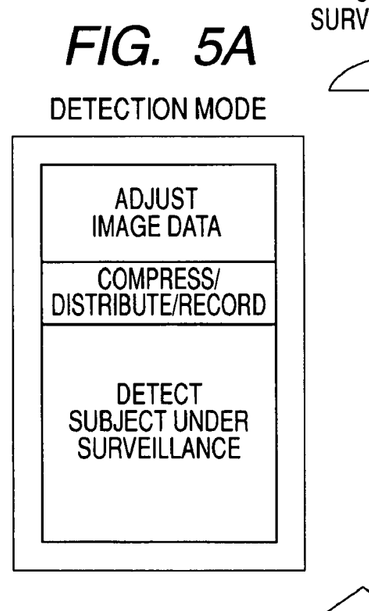
FIGS. 5A and 5B are schematic diagrams showing the allocation of the processing ability of a processor in accordance with the detection mode (5A) and the shooting mode (5B).
Figure 5B:
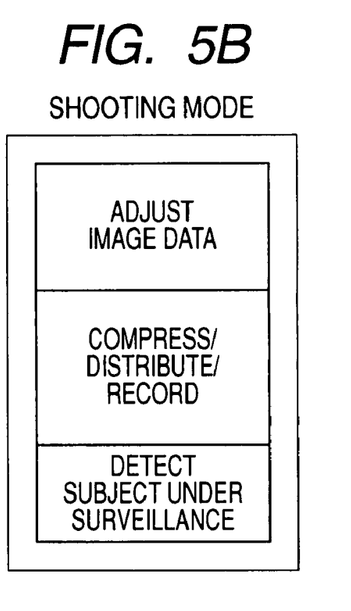

More specifically, in the detection mode, a larger proportion of the processing ability of the processor is allocated to the processing of the detection processing section 13d than those to the image data adjustment processing to be performed by the compression processing section 13a, distribution processing section 13b, the recording processing section 13c and the image creating section 12, as shown in FIG. 5A. On the other hand, in the shooting mode, a larger proportion of the processing ability of the processor is allocated to the image data adjustment processing to be performed by the compression processing section 13a, distribution processing section 13b, the recording processing section 13c and the image creating section 12 than that to the processing of the detection processing section 13d, as shown in FIG. 5B.

The invention is not limited to the embodiment, but various changes may be made thereto without departing from the scope and spirit of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   an image creating section imaging a predetermined surveillance range and creating image data;
   an image processing section in which computing processing means having a predetermined processing ability performs first image processing of detecting an abnormality in the surveillance range in accordance with the image data and generating first detection signal and second image processing of converting the image data to a predetermined data format in parallel; and
   a determination processing section determining whether a predetermined subject under surveillance exists in the surveillance range or not based on the first detection signal, generating and supplying a first control signal to the image processing section if it is determined that the subject under surveillance does not exist in the surveillance range, and generating and supplying a second control signal to the image processing section if it is determined that the subject under surveillance exists in the surveillance range,
   wherein the image processing section allocates a larger proportion of the processing ability of the computing processing means to the first image processing performed by a detection processing section than that to the second image processing performed by a compression processing section, a distribution processing section and a recording processing section if the first control signal is supplied thereto and allocates a larger proportion of the processing ability of the computing processing means to the second image processing performed by the compression processing section, the distribution processing section and the recording processing section than that to the first image processing performed by the detection processing section if the second control signal is supplied thereto,
   wherein, both, the first image processing performed by a detection processing section and the second image processing performed by a compression processing section are performed whether or not the first control signal is supplied thereto.

2. The imaging apparatus according to claim 1, wherein the determination processing section determines whether the subject under surveillance exists in the surveillance range or not based on the first detection signal and an abnormality detection signal supplied from a predetermined detecting means for detecting an abnormality in the surveillance range.

3. A control method for an imaging apparatus that images a predetermined surveillance range and detects a subject under surveillance, the method comprising the steps of:
   imaging the surveillance range and creating image data;
   performing first image processing of detecting an abnormality in the surveillance range in accordance with the image data and generating a first detection signal and second image processing of converting the image data to a predetermined data format in parallel by computing processing means having a predetermined processing ability;
   determining whether the subject under surveillance exists in the surveillance range or not based on the first detection signal;
   allocating a larger proportion of the processing ability of the computing processing means to the first image processing performed by a detection processing section than that to the second image processing performed by a compression processing section, a distribution processing section and a recording processing section if it is determined that the subject under surveillance does not exist in the surveillance range; and
   allocating a larger proportion of the processing ability of the computing processing means to the second image processing performed by the compression processing section, the distribution processing section and the recording processing section than that to the first image processing performed by the detection processing section if it is determined that the subject under surveillance exists in the surveillance range,
   wherein, both, the first image processing performed by a detection processing section and the second image processing performed by a compression processing section are performed whether or not the first control signal is supplied thereto.

4. The control method for an imaging apparatus according to claim 3, wherein whether the subject under surveillance exists in the surveillance range or not is determined based on the first detection signal and an abnormality detection signal supplied from a predetermined detecting means for detecting an abnormality in the surveillance range.

5. An imaging apparatus comprising:
   an image creating section imaging a predetermined surveillance range and creating image data;
   an image processing section in which a computing processing unit having a predetermined processing ability performs first image processing of detecting an abnormality in the surveillance range in accordance with the image data and generating a first detection signal and second image processing of converting the image data to a predetermined data format in parallel; and
   a determination processing section determining whether a predetermined subject under surveillance exists in the surveillance range or not based on the first detection signal, generating and supplying a first control signal to the image processing section if it is determined that the subject under surveillance does not exist in the surveillance range, and generating and supplying a second control signal to the image processing section if it is determined that the subject under surveillance exists in the surveillance range, wherein the image processing section allocates a larger proportion of the processing ability of the computing processing unit to the first image processing performed by a detection processing section than that to the second image processing performed by a compression processing section, a distribution processing section and a recording processing section if the first control signal is supplied thereto and allocates a larger proportion of the processing ability of the computing processing unit to the second image processing performed by the compression processing section, the distribution processing section and the recording processing section than that to the first image processing performed by the detection processing section if the second control signal is supplied thereto, wherein, both, the first image processing performed by a detection processing section and the second image processing performed by a compression processing section are performed whether or not the first control signal is supplied thereto.

* * * * *